United States Patent [19]

Bouchoud

[11] Patent Number: 5,023,421
[45] Date of Patent: Jun. 11, 1991

[54] DEVICE FOR LIMITING THE WITHDRAWAL OF THE ELECTRODE OF A DIE SINKING MACHINE

[75] Inventor: Marcel Bouchoud, Geneva, Switzerland

[73] Assignee: Charmilles Technologies SA, Meyrin, Switzerland

[21] Appl. No.: 432,791

[22] Filed: Nov. 7, 1989

[30] Foreign Application Priority Data

Nov. 8, 1988 [CH] Switzerland ............ 04142/88

[51] Int. Cl.$^5$ ............ B23H 7/14; B23H 7/32
[52] U.S. Cl. ............ 219/69.13; 200/61.42; 219/69.16
[58] Field of Search ............ 219/69.19, 69.17, 69.16, 219/69.2, 68, 69.13, 69.18; 200/61.41, 61.42, 61.44; 204/224 M

[56] References Cited

U.S. PATENT DOCUMENTS

| 3,125,700 | 3/1964 | Bentley et al. | 219/69.16 |
| 3,138,691 | 6/1964 | Livshits et al. | 219/69.19 |
| 3,609,279 | 9/1971 | Giesbrecht | 219/69.16 |
| 3,694,599 | 9/1972 | Davis | 219/69.16 |
| 3,777,104 | 12/1973 | Bell, Jr. | 219/69.16 |
| 3,866,004 | 2/1975 | Nawrocki | 200/61.42 |
| 4,387,284 | 6/1983 | Nicholas et al. | 219/69.16 |
| 4,510,365 | 4/1985 | MacGregor et al. | 219/69.19 |
| 4,578,555 | 3/1986 | Inoue | 219/69.19 |

FOREIGN PATENT DOCUMENTS

| 1513576 | 7/1969 | Fed. Rep. of Germany | 200/61.41 |
| 274822 | 12/1986 | Japan | 219/69.18 |
| 963786 | 10/1982 | U.S.S.R. | 219/69.17 |
| 2174106 | 10/1986 | United Kingdom | 219/69.2 |

Primary Examiner—Geoffrey S. Evans
Attorney, Agent, or Firm—Gifford, Groh, Sprinkle, Patmore and Anderson

[57] ABSTRACT

A device comprising an element mounted on the frame 1 and having a microswitch 8 that can be actuated by a mechanical part 9 and which causes the machining current to be cut off when this part 9 arrives opposite it when the machining head 5 moves up.

The mechanical part 9 is movable along the guide rod 10 mounted on the machining head 5 and can be fixed at a given height at the start of machining. This height is such that the distance h between the part 9 and the microswitch 8 is less than the distance H between the surface of the workpiece 4 and the level of the machining liquid.

The part 9 moves as one with the machining head 5.

9 Claims, 2 Drawing Sheets

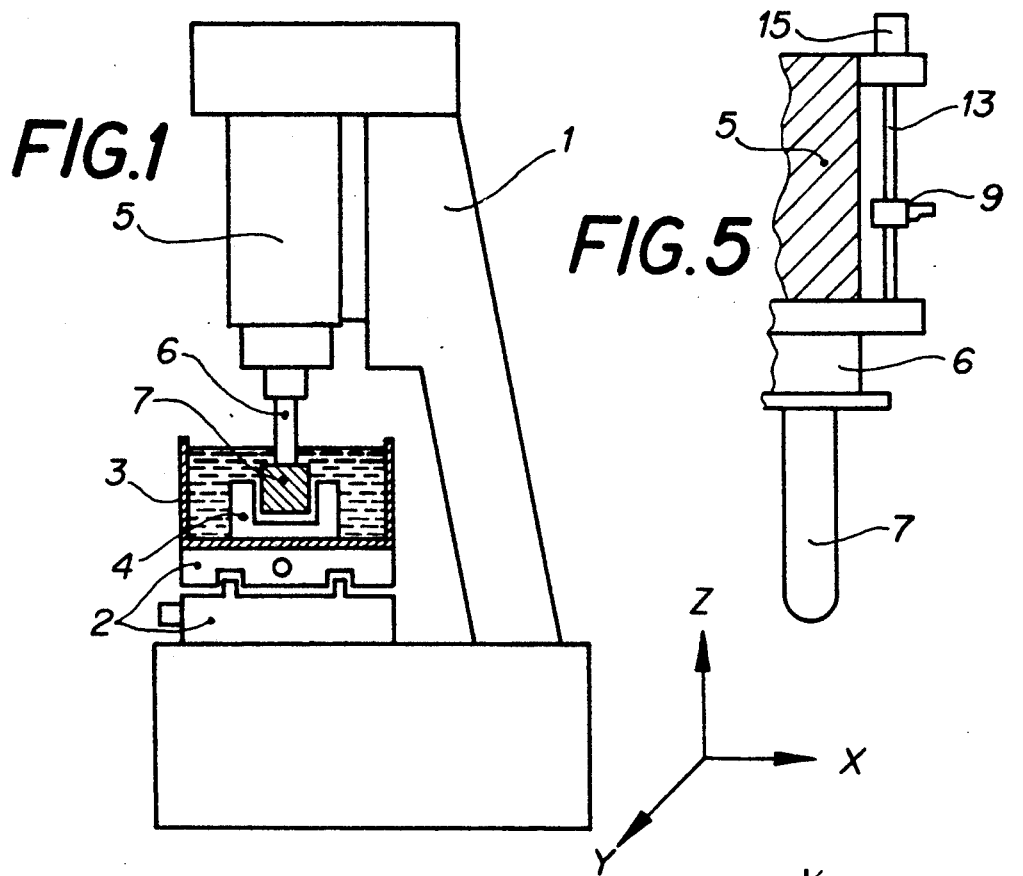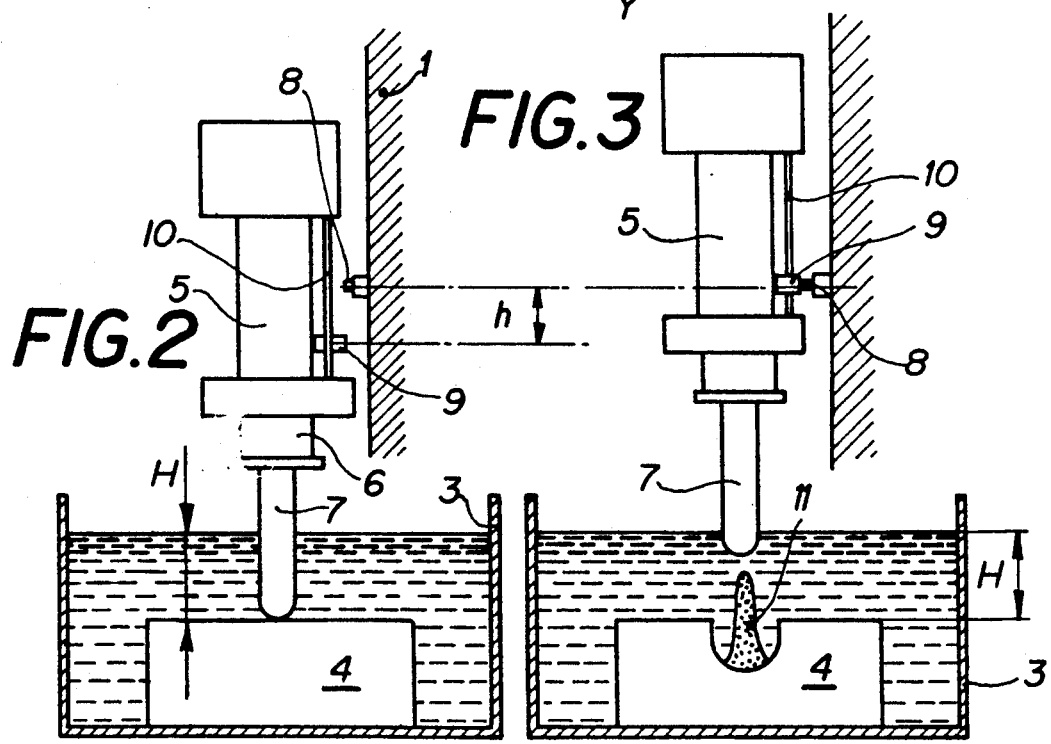

DEVICE FOR LIMITING THE WITHDRAWAL OF THE ELECTRODE OF A DIE SINKING MACHINE

This invention relates to a device for interrupting the operation of a die-sinking machine as soon as the machining zone is no longer immersed in the machining liquid as a consequence of the upward movement, generally unintentional, of the tool-electrode. The machining liquid for die-sinking by electrical discharge machining is generally a hydrocarbon; if the machining zone is no longer immersed in this liquid because the tool-electrode has moved up too far, the sparks occur at the surface of the liquid, in contact with the hydrocarbon vapours, and may cause a fire by igniting this liquid. Such unintentional raising of the tool-electrode occurs fairly frequently in the case of a continuous arc, especially when the tool-electrode is made of graphite. Surface build-up of graphite occurs which may attain several centimeters, and this has the effect of causing the tool-electrode to gradually move higher. Numerous fire prevention devices for EDM die-sinking machines are known in the prior art, most of which use electronic arc-detection systems. They are generally arranged either to modify certain machining parameters so as to suppress the arcing and thereby prevent the formation of a continuous arc or to interrupt machining in the following two cases :- the dielectric level is too low- the dielectric temperature is too high. Certain state-of-the-art electronic devices also allow detection of a large amplitude retraction of the tool-electrode; others have a tool-electrode position indicator; these various types of electronic devices can thus contribute to fire prevention. The device of this invention is much simpler and less expensive than these known devices; moreover, it can easily be fitted to existing machines. It comprises the characterizing features of a first element mounted on the frame and a second element mounted on the machining head in such a way that it moves with the head, these elements being arranged to work together, the effect of these elements working together being to cause the machining current to be cut off when they come opposite each other as the machining head moves up. The vertical position of one of these elements on the machining head carrying the tool-electrode or on the column of the machine frame is adjustable to a predetermined height, the other element being fitted at a fixed height. One of these elements is connected in an electrical circuit and is such as to cause the machining current to be cut off when it is actuated by the other element with which it works. The device also comprises appropriate means for moving and fixing in position the vertically movable element and the electrical circuit incorporating the element that can cause machining to be interrupted.

According to the first variant of this invention, one of the elements of the device of this invention is a mechanical part mounted on the machining head in such a way that its vertical position can be set to a predetermined height. The other element is a microswitch fixed to the column of the die-sinking machine and connected in an electrical circuit arranged so as to cut off the machining current when the microswitch is actuated. The mechanical part is shaped so as to actuate the microswitch when it arrives at the same height as the switch as the machining head moves up.

According to the second variant, one of the elements is a position sensor, mounted for example on the machine frame, so as to work in conjunction with the second element which is an electronic scale mounted on the machining head. This sensor is connected to a counter that indicates the vertical movement of the machining head. This indication may, for example, be made with respect to a vertical reference value, determined from the position of the machining head when machining is started and taking into account the height of the liquid above the workpiece to be machined (30-40 mm for example). This counter is linked to a system that sends a signal to interrupt machining as soon as the position determined by the counter reaches or goes beyond the reference value.

BRIEF DESCRIPTION OF THE DRAWING

The invention is best described by means of the appended drawings in which FIG. 1 shows schematically the main components of an EDM die-sinking machine, FIGS. 2 and 3 illustrate one of the ways in which this invention can be realized, FIG. 5 shows a horizontal configuration of the mechanical part of this invention.

DESCRIPTION OF THE PREFERRED EMBODIMENTS OF THE PRESENT INVENTION

Figure 4:
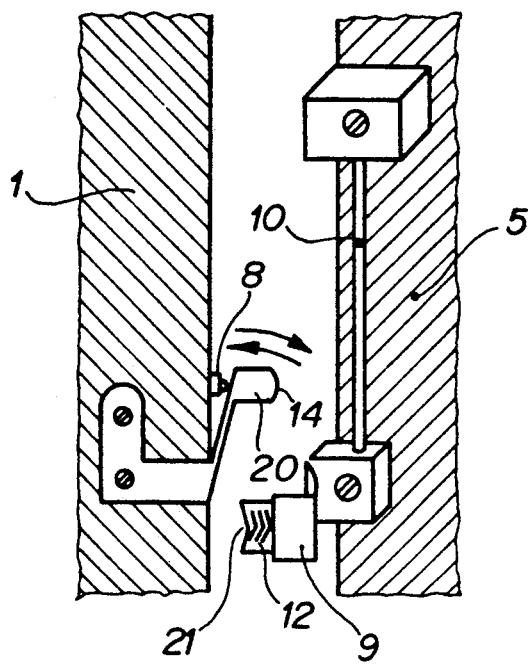
FIG. 4 represents one of the possible configurations for the movable element and the fixed element of this invention.

The main elements forming an EDM die-sinking machine may be briefly described as follows, some of these elements being shown in FIG. 1. The frame is generally provided with a column 1 and a support for a table 2 on which rests a work-tank 3 filled with the machining liquid. The work-tank 3 is equipped with means (not shown) for clamping the workpiece 4 so as to hold it fixed with respect to the work-tank. The column 1 carries a machining head 5 that is generally able to slide vertically by means of a motor driven slide. This head 5 is provided with an electrode holder 6 holding a tool-electrode 7 and with a servo mechanism for controlling the movement of the head along the vertical axis Z so as to cause the tool-electrode to be advanced towards and into the workpiece-electrode 4 in order to machine this workpiece-electrode. The head 5 may also be provided with the components necessary for controlling the movements of the tool-electrode with respect to the head, such as rotation about a vertical axis.

The work-tank 3 is generally made to move horizontally by means of a table 2 on which it rests, this table being provided with cross slides for motion with respect to two orthogonal horizontal axes X and Y. The movements of the table 2 are obtained by means of motors controlled by appropriate circuits (not shown).

A generator (not shown), arranged to generate intermittent electrical pulses, is connected to the electrodes. Devices of known type allow control of the speed with which the electrodes move with respect to each other so as to maintain a characteristic quantity of the electrical discharge conditions at a determined value.

FIGS. 2 and 3 illustrate one method of execution of the device according to this invention.

The fixed element is a microswitch 8 mounted on the column 1 and forming part of a circuit arranged to interrupt the machining when this microswitch is depressed. The mechanical part 9 actuating the microswitch is a part with a projecting point shaped to depress the microswitch 8 when it arrives at the height of the microswitch. One of the possible configurations is shown schematically in FIG. 4. This part is held on the machining head at a given height that can be adjusted at the beginning of the machining operation. The part 9 is able to slide along a vertical rod 10 fixed alongside the machining head 5. The part 9 is moved manually along the rod 10 and is held at the position chosen by the operator, without further action, simply by virtue of the coefficient of friction between it and the rod.

It is the vertical movement of the machining head 5 that brings the mechanical part 9 closer to or further away from the fixed element 8. It suffices to position the mechanical part 9 on the rod 10 so that it is opposite the fixed element 8 when the tool-electrode 7 is raised to a height such that the end of the tool-electrode where the electrical discharges take place is about to be no longer immersed in the machining liquid (see FIG. 3), for example when this end is only a few millimeters below the surface of this liquid.

The functioning of the device of this invention is very simple : at the beginning of the machining operation, the tool-electrode is brought to a position close to the upper face of the workpiece which is itself immersed in the machining liquid. The operator moves the movable element (the mechanical part 9) along the rod 10 to a point at a given distance (h) below the fixed element (the microswitch 8). This distance must be less than the distance (H) between the surface of the workpiece 4 and the level of the machining liquid (FIG. 2). As soon as the vertical retraction of the tool-electrode reaches this value h (for example, as a consequence of the formation of a "stalagmite" 11), the machining current is cut off by the action of the part 9 on the microswitch 8. Machining and the upwards motion of the head 5 are stopped without any action on the part of the operator. At this point, the machining face of the tool-electrode is still immersed, since $h < H$.

Thus the value of h depends on H and will therefore be chosen depending on the level of liquid in the work-tank 3, the thickness of the workpiece 4 and the height at which the workpiece is fixed in the work-tank.

When machining is stopped, a signal may also be generated to warn the operator so that he can restart machining, this signal being optical, acoustic, etc.

The element 8 and the part 9 may have numerous possible configurations, for example those shown schematically in FIG. 4 : the lug 12 mounted on the part 9 sliding on the rod 10 is shaped to push the spring blade 20 against the microswitch 8 when it comes into contact with it as the head 5 moves up.

It incorporates a sort of trough 21 to guide the end 14 of the spring blade 20 and progressively push it against the microswitch 8 when the part 9 arrives at the height of the microswitch which is then depressed. A configuration of this kind allows the head 5 to move up and actuate the microswitch 8 as it goes past, thereby cushioning the impact between the two elements which would otherwise be considerable given the mass of the head 5. In point of fact, on account of its inertia the head 5 continues to move upwards even after machining has been cut off by the microswitch 8. As soon as the trough 21 has moved beyond the spring blade 20, this blade moves away from the microswitch 8 and returns to its initial position.

Numerous variants of the method of realization illustrated in FIGS. 2 and 3 are possible, without going outside the scope of this invention. Numerous modifications may be made, in particular as regards the method of actuation of the microswitch by the movable part, the shape of this movable part, the means of moving it and fixing it in position, etc. Thus, the reference position of the part 9 may be adjusted by means of a screw 13 actuated by a part 15 operated by any known means, the assembly being mounted on a bracket fixed to the machining head (FIG. 5). The part 9 may also move along a rail fixed to the machining head. It may be held in position by any known means, for example by tightening a screw, etc.

Figure 6A:
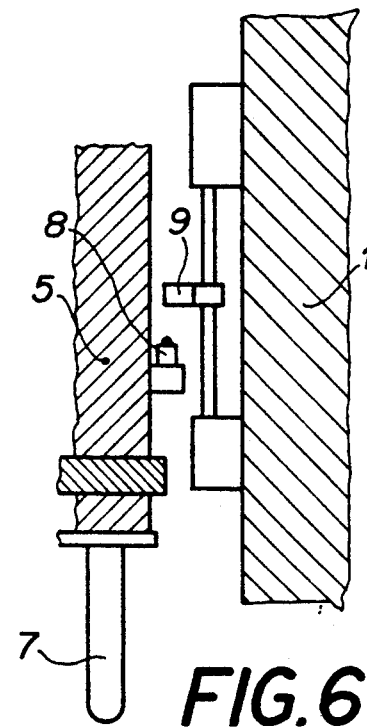
FIGS. 6a and 6b show a configuration with a vertically positioned microswitch.
Figure 6B:
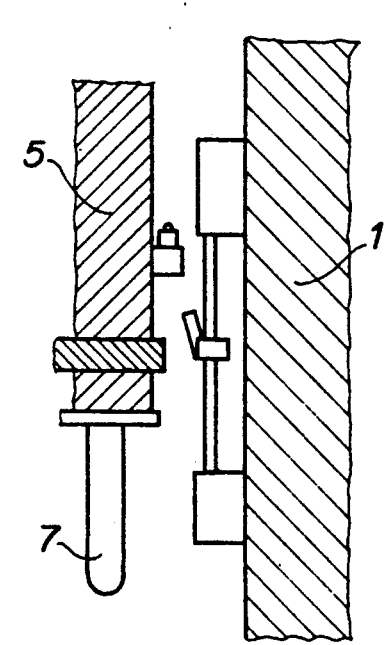

In the example illustrates in FIGS. 6a and 6b, instead of being actuated horizontally as in FIGS. 2 to 5, the microswitch 8 is actuated vertically. The part 9 can not only move vertically but can also pivot between the operating position indicated in FIG. 6b, in which it can come into contact with the element 8, and a rest position FIG. 6a in which it is not in the path of the element 8. This arrangement, enables the machining head to be moved to the low position at the beginning of the machining operation. The part 9 may pivot in a horizontal plane for example or may be hinged to allow it to be swung away vertically (see FIG. 6b). The part 9 may also be, for example, a plate that can be fitted in one of several possible positions distributed vertically.

The element capable of causing the machining current to be cut off is not necessarily a microswitch. It may be any known electrical component of known type opening or closing an electrical circuit as soon as it is subjected to a pressure, an impact, optical excitation, an increase in temperature, etc., the complementary element able to actuate it also being of known type.

Evidently, the method of realization illustrated in FIGS. 2 to 5 and its variants is in no way limitative in character.

According to other variants, the mechanical part of adjustable height moves along a system fixed to the column of the machine frame and it is the element able to cause the machining current to be cut off (the microswitch) that is fixed to the machining head. The mechanical part may also be the fixed element (and be fixed either to the column or to the machining head),the element able to cause the current to be cut off then being the element of adjustable height, being fixed to the head or the column respectively.

When adjustment of the height of the part of adjustable height is accompanied by an operation by the operator to hold it at the height chosen, a special arrangement may be provided to make this operation activate the start of machining, by closing an electrical circuit for example. This represents a safety interlock since machining cannot start if the operator has forgotten to adjust the height of the part of adjustable height.

According to another method of realization, the device of this invention may also include a system enabling h to be determined automatically, on the basis, for example, of the information given by a sensor indicating the level of the machining liquid and of the reference position of the surface of the workpiece. Such a device may also be provided with means of positioning the part of variable height without action on the part of the operator.

Figure 7:
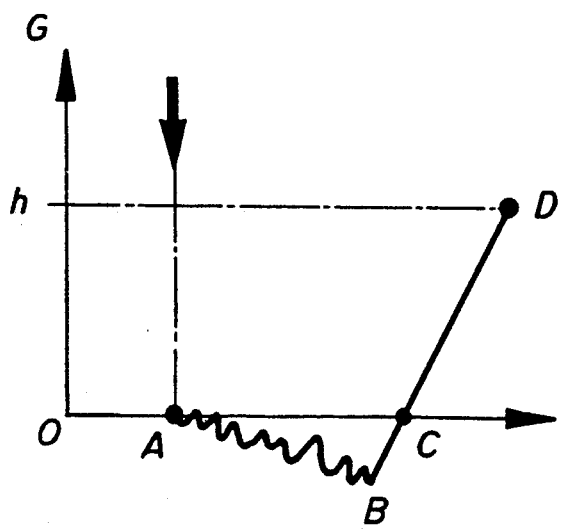
FIG. 7 shows a diagram of tool movement during operation.

In the second variant mentioned at the beginning of this description, according to which the device comprises an electronic scale and a position sensor connected to a counter, this counter is reset to zero at the start of machining (see FIG. 7) when the machining head is close to the surface to be machined. The counter is started when the first electrical discharge takes place, that is to say when machining starts. The quantity G indicated by the counter is representative of the vertical movement of the machining head. At the start of machining, G=0 (point A). The value of G then oscillates about a curve of negative slope corresponding to the progress of machining as the tool-electrode gradually penetrates further into the workpiece. If as a result of continuous arcing a "stalagmite" should form, that is to say more and more material be deposited between the two electrodes, this deposit, by artificially causing an increase in the height of the surface to be machined, causes the electrode to move up and therefore a rapid and regular increase in G (segment BD). The tool-electrode may move to a point higher than its starting position (point C) and even go beyond a danger level (a few millimeters below the level of the dielectric (point D). The electronic system of the device is adjusted to send a signal to the numerical control system of the machine as soon as G reaches the value h so that the control system will cause the machining current to be cut off. According to this variant, because of the fact that the counter is reset to zero at the start of machining, the device can go into operation without any need for action by the operator, since the reference value h may be chosen once and for all, provided that the height of the dielectric above the top of the workpiece is always adjusted to the same value. Therefore, machining can be started without human intervention to activate the device according to this invention.

I claim:

1. A device for interrupting the operation of a die-sinking machine as soon as the machining zone is no longer immersed in the machining liquid as a consequence of the tool-electrode moving back up, comprising:
    a first element mounted on a column of a machine frame,
    a second element mounted on a machining head carrying a tool,
    an electrode mounted to move as one with said machining head when said head moves vertically,
    said first element being arranged to engage said second element so as to cause the machining current to be cut off when said second element arrives opposite said first element and said machining head moves up,
    means for moving and fixing in position a vertically movable element and
    an electrical circuit, said circuit including an element able to cause machining to be interrupted, the vertical position of said frame being adjustable to a predetermined height, said second element being mounted at a fixed height, and said first element being connected to an electrical circuit and being able to cause the machining current to be cut off when it is actuated by said second element when they work in conjunction with each other.

2. The device according to claim 1, characterized by the fact that said second element is connected to said electrical circuit, said second element is able to cause the machining current to be cut off when it is actuated by said first element.

3. The device according to claim 1, wherein said first element mounted to said column is a mechanical part and said second element mounted to said machining head is a microswitch.

4. The device according to claim 3, wherein said microswitch is positioned in an upward and vertical direction on said machining head.

5. The device according to claim 4, wherein said mechanical part is of a two-piece pivoting construction, said part pivoting upon contact with said microswitch to interrupt the die-sinking machine.

6. A device for interrupting the operation of a die-sinking machine as soon as the machining zone is no longer immersed in the machining liquid as a consequence of the tool-electrode moving back up, comprising:
    a first element mounted on a column of a machine frame,
    a second element mounted on a machining head carrying a tool,
    an electrode mounted as to move as one with said machining head when said head moves vertically,
    said first element being arranged to engage said second element so as to cause the machining current to be cut off when said second element arrives opposite said first element and said machining head moves up,
    means for moving and fixing in position a vertically movable element and
    an electrical circuit, said circuit including an element able to cause machining to be interrupted, the vertical position of said frame being adjustable to a predetermined height, said second element being mounted at a fixed height, and said first element being connected to an electrical circuit and being able to cause the machining current to be cut off when it is actuated by said second element; and
    said second element is said vertically movable element, said vertically movable element is a mechanical part whose vertical position on the machining head is adjustable to a predetermined height, said mechanical part is provided with a lug that is shaped so as to push back a spring blade fixed to the machine frame so that it presses on a microswitch that causes interruption on the machining current.

7. The device according to claim 6, characterized by the fact that said part that is able to cause the machining current to be cut off when it is actuated by said other element when they work in conjunction with each other is said microswitch.

8. A device for interrupting the operation of a die-sinking machine as soon as the machining zone is no longer immersed in the machining liquid as a consequence of the tool-electrode moving back up, comprising:
    a first element mounted on a column of a machine frame,
    a second element mounted on a machining head carrying a tool,
    an electrode mounted to move as one with said machining head when said head moves vertically,
    said first element being arranged to engage said second element so as to cause the machining current to be cut off when said second element arrives opposite said first element and said machining head moves up,
    means for moving and fixing in position a vertically movable element and
    an electrical circuit, said circuit including an element able to cause machining to be interrupted, the vertical position of said frame being adjustable to a predetermined height, said second element being mounted at a fixed height, and said first element being connected to an electrical circuit and being able to cause the machining current to be cut off when it is actuated by said second element; and said second element is an electronic scale arranged to work in conjunction with a position sensor mounted on said column of said machining frame, said sensor is connected to a counter arranged to send a signal to the numerical control system of the machine to cause machining to be stopped as soon as the position of the machining head reaches or goes beyond a reference value, said reference value is less than the distance between the surface to be machined and the level of the machining liquid by at least several millimeters.

9. A device for interrupting the operation of a die-sinking machine as soon as the machining zone is no longer immersed in the machining liquid as a consequence of the tool-electrode moving back up, comprising:

a first element mounted on a column of a machine frame, a second element mounted on a machining head carrying a tool, an electrode mounted to move as one with said machining head when said head moves vertically, said first element being arranged to engage said second element so as to cause the machining current to be cut off when said second element arrives opposite said first element and said machining head moves up, means for moving and fixing in position a vertically movable element and an electrical circuit, said circuit including an element able to cause machining to be interrupted, the vertical position of said frame being adjustable to a predetermined height, said second element being mounted at a fixed height, and said first element being connected to an electrical circuit and being able to cause the machining current to be cut off when it is actuated by said second element; and the height to which said vertically movable element is adjusted is predetermined so that at the start of machining the distance between this element and said element mounted at a fixed height is less than the distance between the surface to be machined and the level of the machining liquid.

* * * * *